Figure 1:
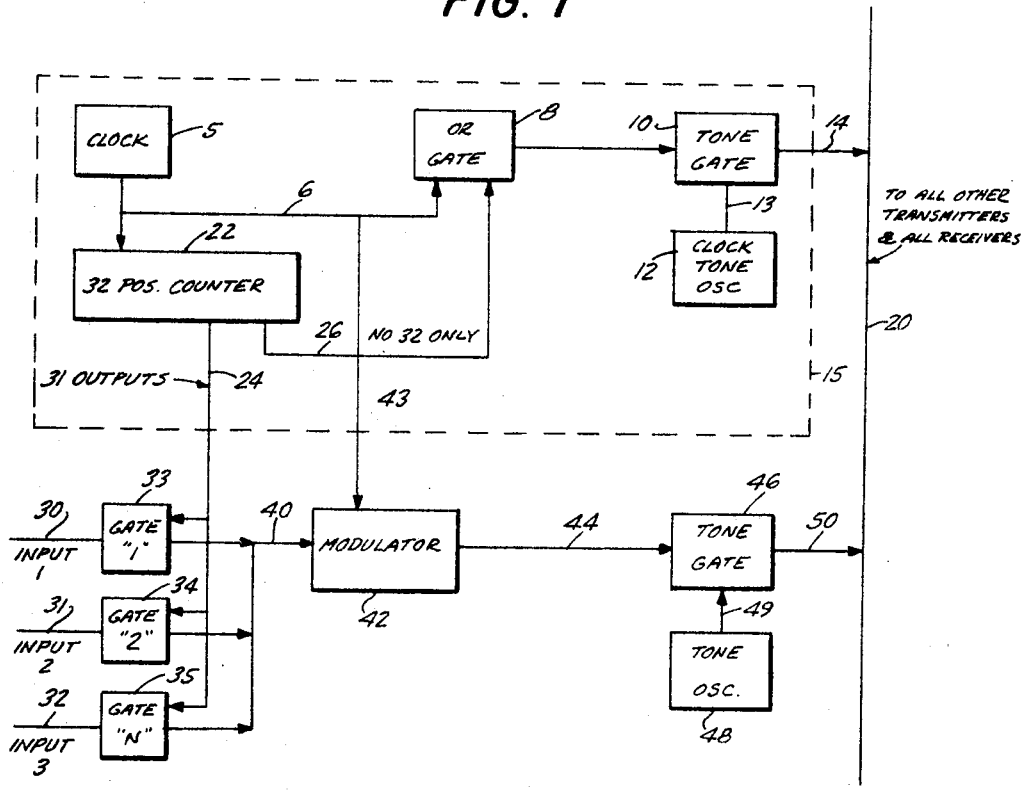

Aug. 23, 1966  C. L. DU VIVIER  3,268,814
PLURAL CARRIER FREQUENCY TELEMETRY AND CONTROL SYSTEM
USING PULSE WIDTH MODULATION
Filed June 3, 1963  7 Sheets-Sheet 1

INVENTOR.
CHARLES L. DuVIVIER
BY
Edward H. Cairns
ATTORNEY

INVENTOR.
CHARLES L. DU VIVIER
BY
Edward H. Eames
ATTORNEY

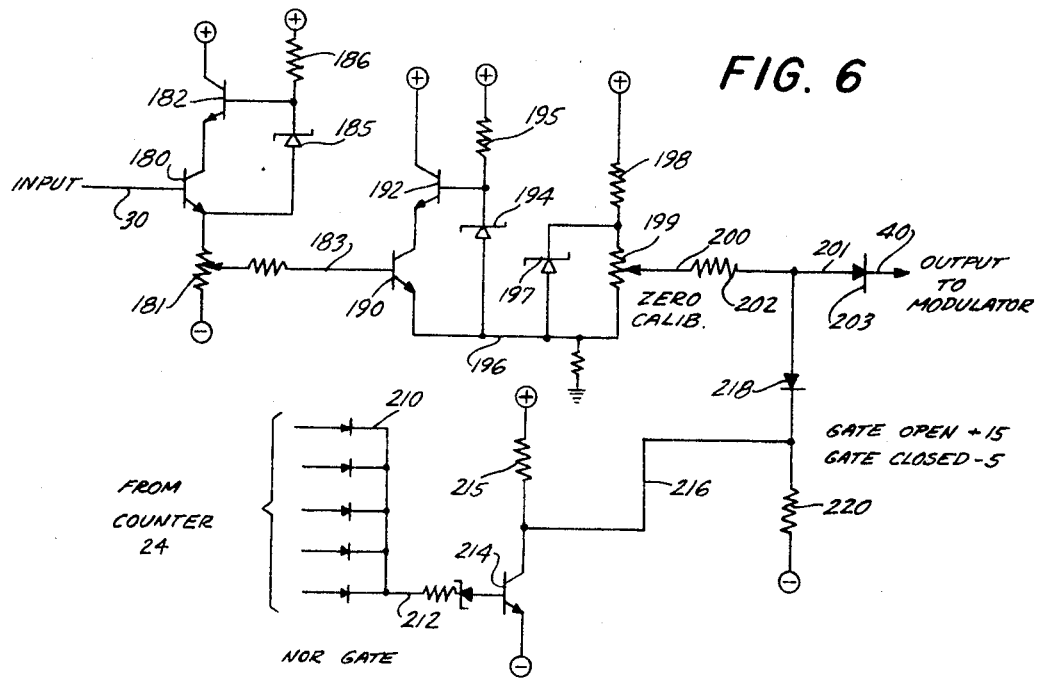
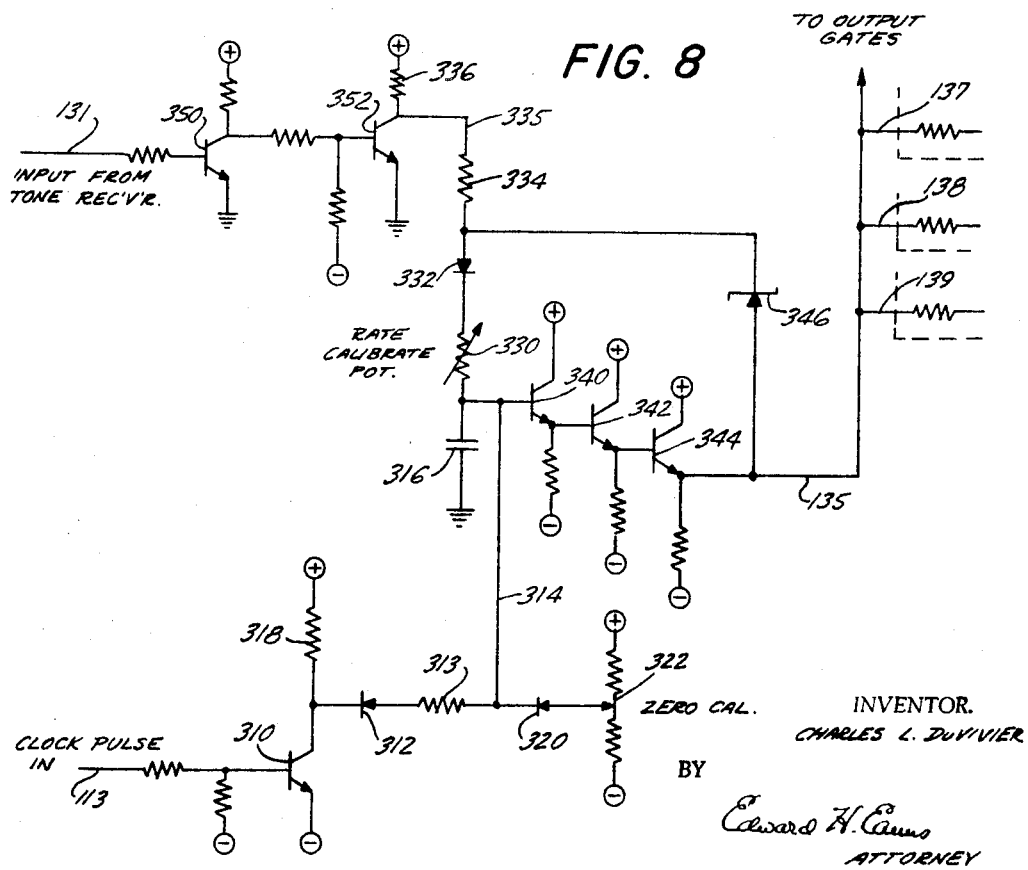

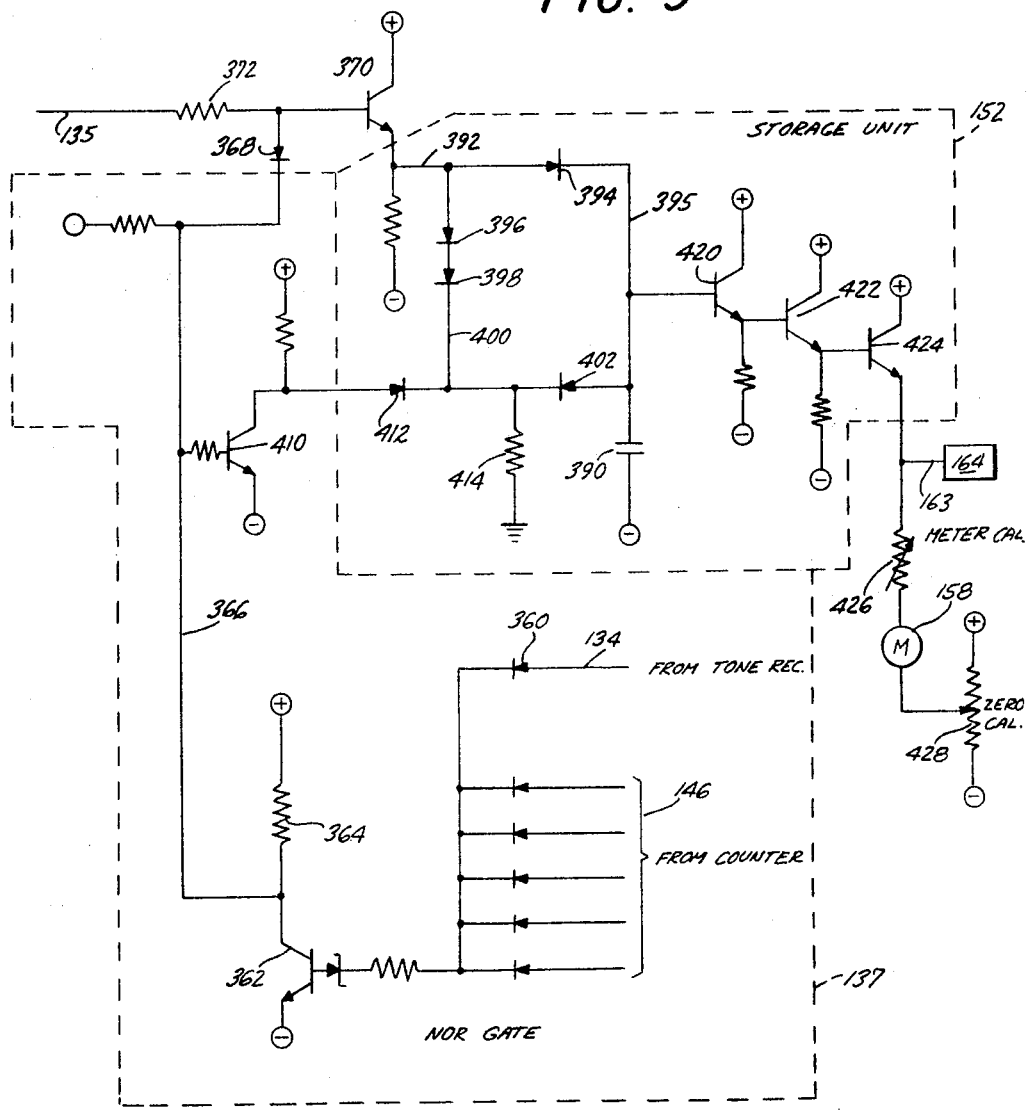

INVENTOR.
CHARLES L. DUVIVIER
BY
Edward H. Eames
ATTORNEY

United States Patent Office 3,268,814
Patented August 23, 1966

3,268,814
PLURAL CARRIER FREQUENCY TELEMETRY AND CONTROL SYSTEM USING PULSE WIDTH MODULATION
Charles L. Du Vivier, Darien, Conn., assignor to Laboratory for Electronics, Inc., Boston, Mass., a corporation of Delaware
Filed June 3, 1963, Ser. No. 284,995
12 Claims. (Cl. 325—58)

This invention relates to a telemetry system for use in traffic control systems in which data from many sources must be brought to a centralized place. In particular, this invention applies to a system in which analog quantities are transmitted over a common line by use of a master timing circuit adapted to control the scanning of various reporting stations and receiving stations coupled with a system for transmitting from the various stations timed pulses, the length of which are representative of the analog quantities being reported.

In traffic control systems, it is often necessary to correlate the control at some central location. This requires receipt from one or more remote stations or intersections of data about one or more characteristics of traffic flow, such as volume, speed, density, direction, lane usage, side-street usage, and the like. It may also involve data as to the offset or other local conditions of the traffic light at particular intersections. This data must be conveyed to a central control point, either for use in manual control purposes or to operate automatic traffic control for an entire area. It is preferable in telemetry systems of this nature that it be possible to use existing narrow band transmission systems, such as telephone lines, though microwave systems may also be used. It is also important that the lines be used efficiently.

Accordingly, one of the objects of my invention is to provide a telemetric system for use in traffic control which is capable of transmitting data over existing telephone lines or over a radio transmitting and receiving link.

Another object of my invention is to provide such a system capable of transmitting analog information, or discrete information when translated into analog form.

Another object of my invention is to provide such a system that is self-synchronizing and therefore incapable of having transmitting and receiving stations out of phase in the multiplexing types of transmission.

Another object of my invention is to provide such a system that is adapted to detect and indicate the failure of any one of the data transmissions.

Another object of my invention is to provide such a system that can be readily and economically designed and built.

In general, these and other objects of my invention are accomplished by use of clock synchronization of master and slave transmitters and receivers. These clock pulses are transmitted on a suitable tone carrier for each transmitter and receiver, which clock pulses serve to actuate in synchronism each transmitting station in the system, and also to actuate in synchronism each receiving station. Each of the transmitting stations in turn then provides one or more output signals, which are transmitted on a different tone carrier form that of the clock pulse, and each of which contains a sequence of pulses, one for each function to be transmitted, and the duration of which is functionally related to the value of the analog function being transmitted. If desired, discrete quantities representing control signals may also be converted to pulse length and transmitted. Such discrete signals might indicate settings of traffic control units, as set forth in United States Letters Patent No. 2,542,978, issued to John L. Barker, and might have a magnitude of 0, 4, 6, and 8 volts, for example. These settings could indicate, for example, "inbound" offset, "outbound" offset, and the like.

In the preferred form of my invention, a given tone channel may transmit up to thirty-one sub-channels in sequence over a period of approximately twenty-five seconds. However, it is possible to transmit additional full channels or to increase the speed of scanning and so the number is limited only by the passband width of the transmission channel. Within the frequency limits of a normal telephone line, for example, approximately fifteen such channels are possible.

Figure 2:
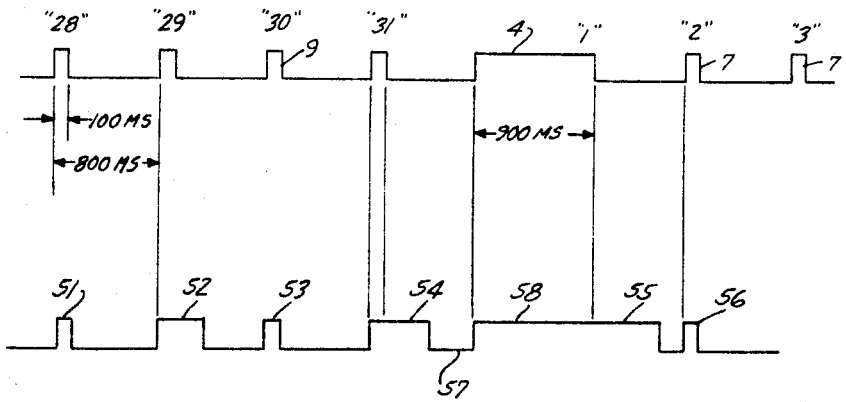
Figure 4:
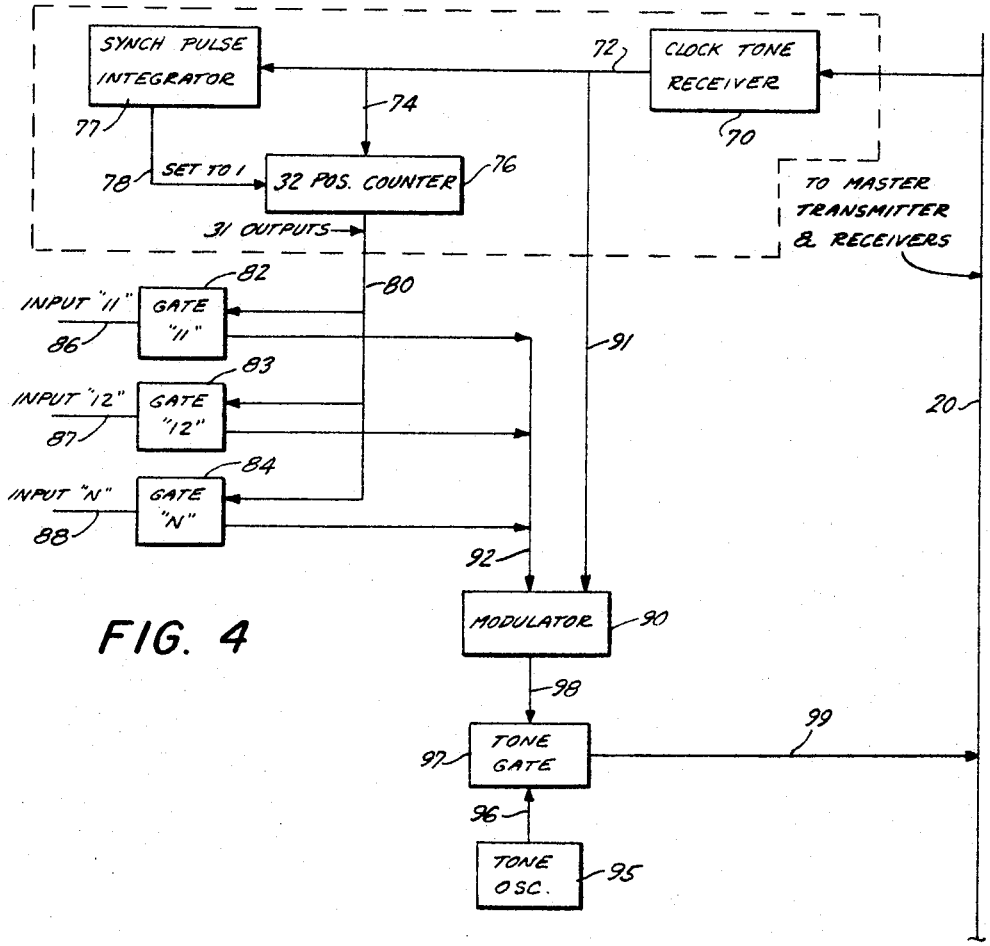
Figure 3:
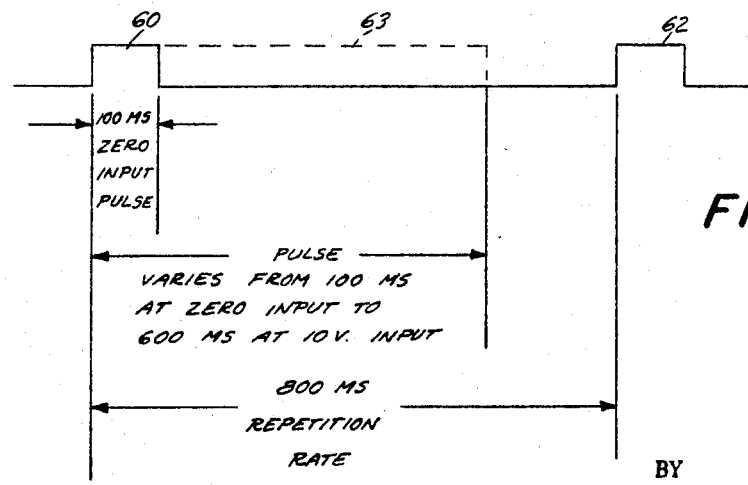
Figure 5:
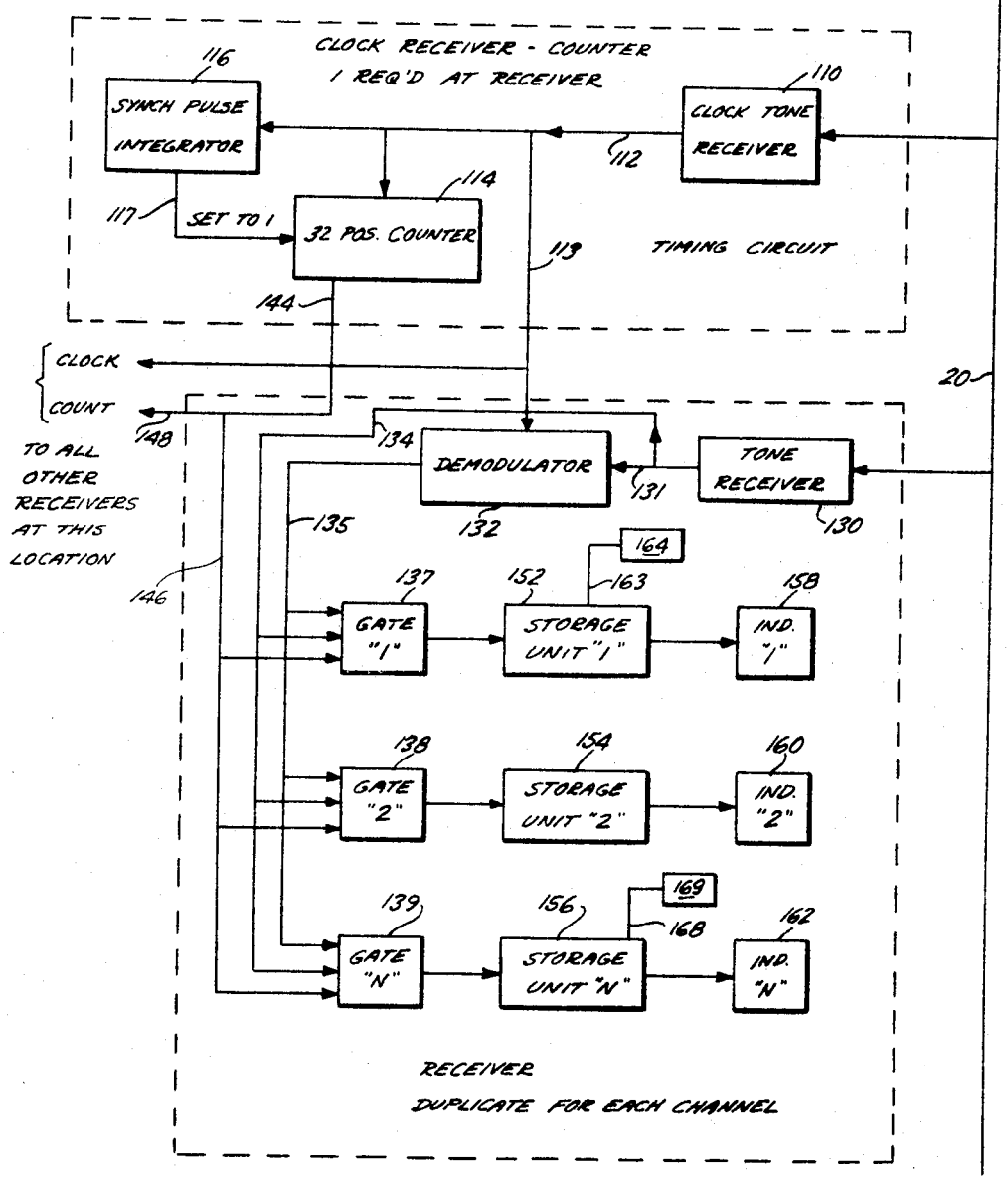
Figure 7:
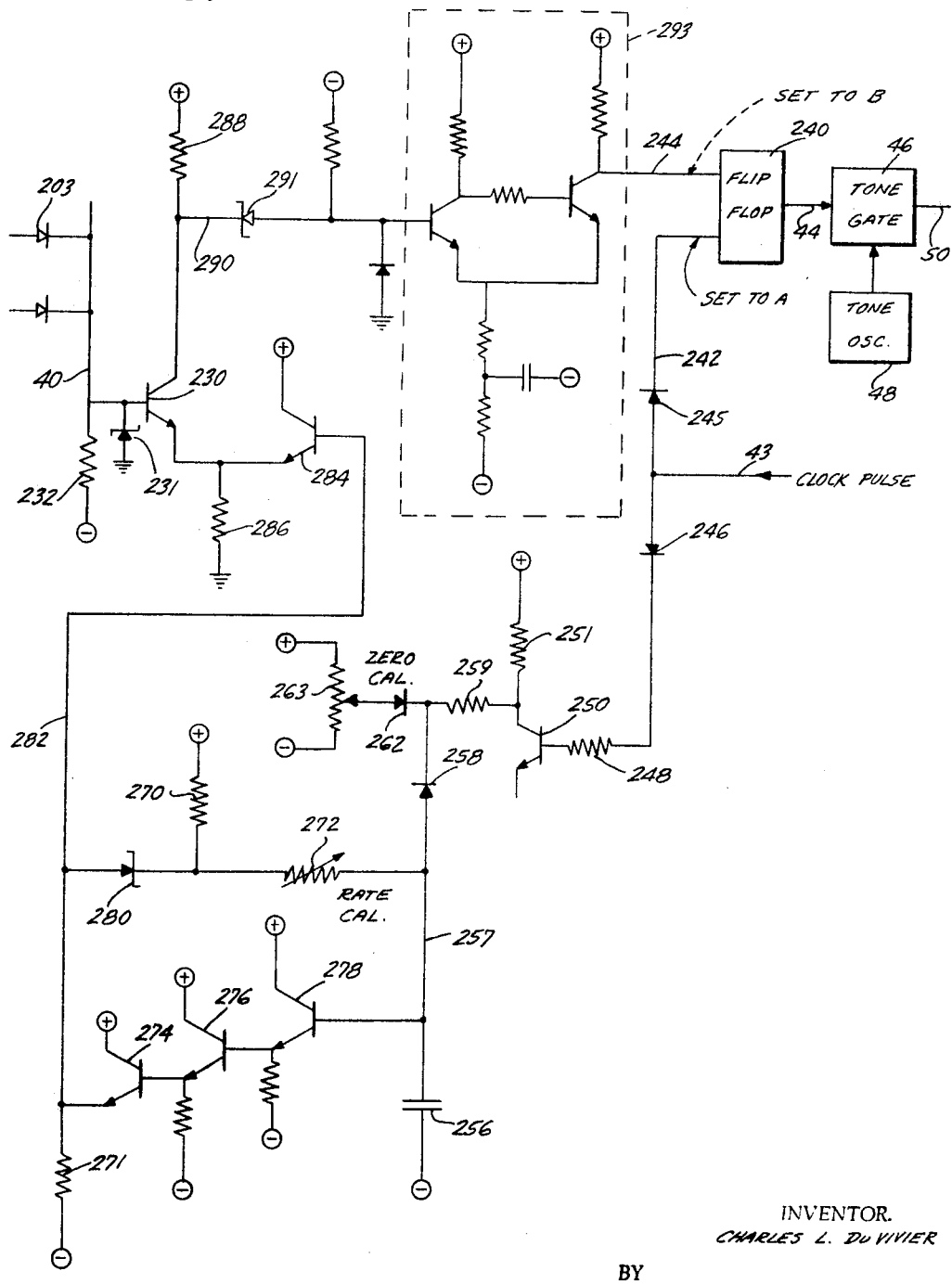
Figure 10:
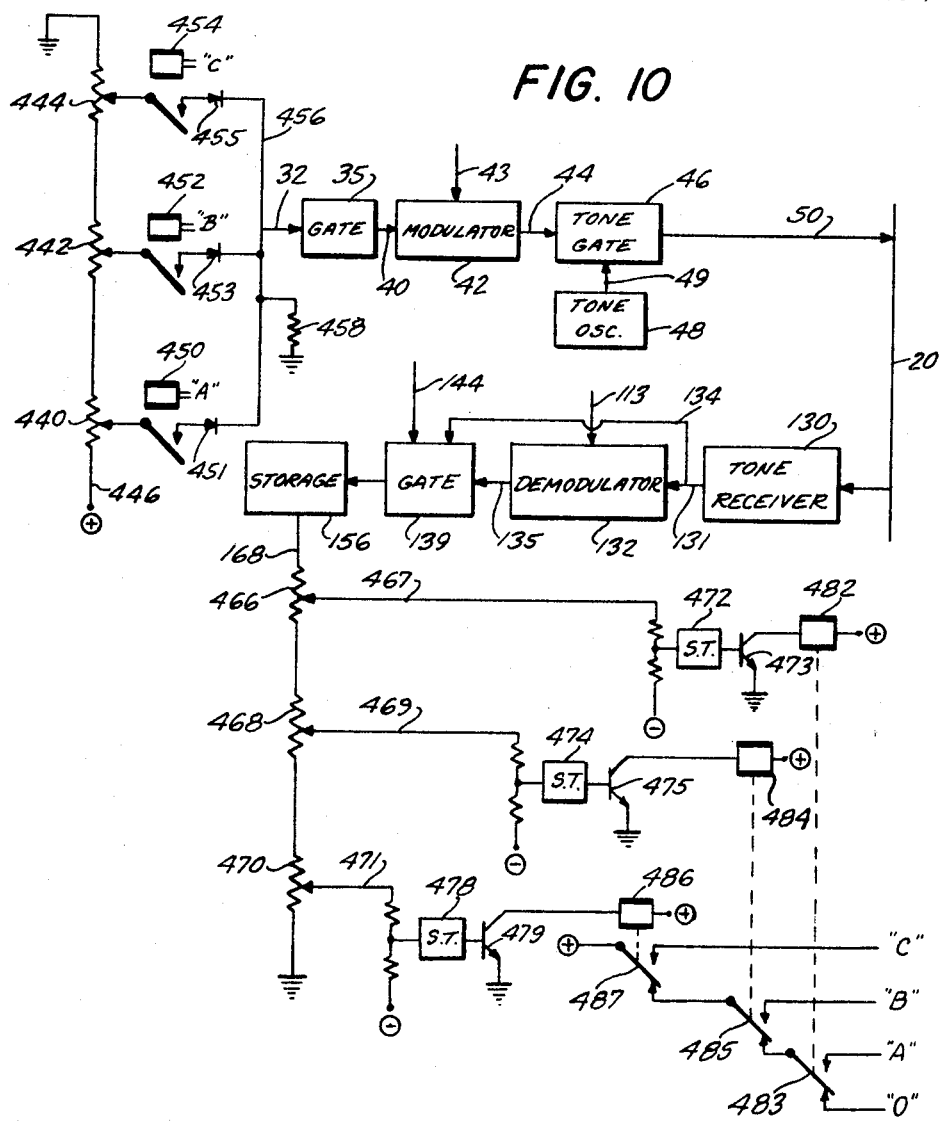
Figure 11:
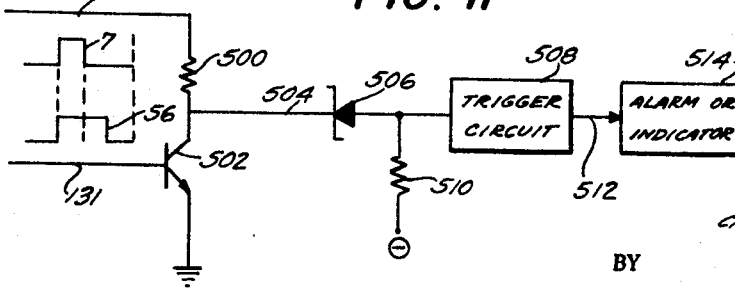

Details of the operation are shown in the attached drawings in which:

FIG. 1 is a block diagram of the master transmitter;
FIG. 2 is a clock channel transmission showing the switching and synchronizing pulses and a typical information channel showing the variable lengths of pulses of the data being transmitted;
FIG. 3 is an enlarged portion of one section of the information channel signal of FIG. 2;
FIG. 4 is a block diagram of a slave transmitter;
FIG. 5 is a block diagram of a receiving unit adapted to operate in synchronism with the various transmitting units;
FIG. 6 is a circuit diagram showing the preferred type of input gate for use in transmission from the stations within the system;
FIG. 7 is a circuit diagram of a modulator to be used to set pulse lengths in accordance with the analog value of the input;
FIG. 8 is a circuit diagram of a demodulator to be used at a receiving station;
FIG. 9 shows the gating arrangement, storage unit, and indicators for showing the input for each transmitting station.
FIG. 10 is a diagram showing a transmitting and receiving station adapted to convert particular circuit operations into discrete voltages for further translation and transmission in accordance with the teaching of my invention and for receiving the translated voltages and converting them into discrete voltages and particular circuit operations corresponding to the original circuit operations; and
FIG. 11 shows a partial circuit diagram of a circuit adapted to indicate to the user when any of the data transmissions is inoperative.

FIG. 1 shows a block diagram of the timing circuit used to time the entire system of my invention and of a transmitting circuit. The timing circuit may be located at any point within the system, since it is adapted to transmit a tone signal for timing pulses to all transmitting and receiving units within my system. It is shown in FIG. 1 as being located as part of a transmission system for one or a plurality of transmitting stations. Consequently, this transmission system of FIG. 1 may be identified as a "master transmitter."

The timing circuit, shown in dotted outline 15 at the top of FIG. 1, includes a clock 5 which is simply a pulse generator adapted to produce periodic pulses. In the preferred form of my invention the pulses will be square waves transmitted at the rate of one every 800 milliseconds. The pulses themselves will be 100 milliseconds in duration. A complete cycle of timing is represented by thirty-two pulses, providing for the transmission of thirty-one functions, for reasons that will be described below.

FIG. 2 shows, in its upper portion, a sample of a portion of the clock pulses. These pulses identified generally by the numeral 7 are also given numbers in the timing sequence. Shown in the upper portion of FIG. 2 are pulses "1," "2," and "3," and "28," "29," "30," and "31." It will be noted that there is no pulse "32" and that pulse "1" is of a width that would be equivalent to the pulses "32" and "1" and the intervening time interval, that is a total of 900 milliseconds. This pulse is for purposes of synchronization.

Returning to FIG. 1, the output of clock 5 is a continuous series of short pulses 7. This output passes from clock 5 through lead 6 to OR gate 8 and thence to tone gate 10, where it modulates an audio tone as a carrier provided by clock tone oscillator 12 through lead 13. The output of tone gate 10, then, is a pulsed oscillation. This output passes through lead 14 to master interconnecting line 20.

The pulse output of the clock 5 also passes into 32-position counter 22. This counter is of the binary type for example and is made up of five cascaded flip-flops having two associated output leads connected to each flip-flop. Lead 24 from 32-position counter 22 is actually ten lines, carrying the on and off positions for each flip-flop, which pass selectively to the various gates of the transmitting stations of the master transmitter circuit. The leads representing count "32" are shown at 26 and pass into OR gate 8. Thus for count "32" a wide synchronizing pulse 4 is produced by the OR gate 8 and passes into tone gate 10 and thence to the master line 20.

Inputs "1," "2," through "N" are indicated by leads 30, 31 and 32 passing into gates 33, 34 and 35, respectively. Depending upon the particular circuit configuration desired, these gates may be either NOR or AND gates. In the present design, however, I have utilized NOR gate configuration. These gates and inputs operate in a manner shown in the circuit of FIG. 6 and in turn, when their count number is reached, produce their respective outputs on lead 40 passing to modulator 42. The gates also include calibration circuitry to provide corresponding voltage ranges for the several inputs. The outputs from the respective gates are calibrated voltages representing the voltage on the input lines 30, 31 and 32.

The modulator shown in FIG. 1 is synchronized with the gates 33, 34 and 35 through the clock pulses 7 received from clock 5 through leads 6 and 43 and produce an output for each input in turn. This output is a pulse having a length which corresponds linearly with the magnitude of the voltage on the input. This output passes from the modulator on lead 44 to tone gate 46. There it modulates a second audio tone as a carrier received from tone oscillator 48 on lead 49. This modulated tone passes from the tone gate 46 through lead 50 to the master line 20. The signal thus presented to line 20 through lead 50 is a series of pulses of the second audio tone in sequence corresponding to their gating. Their tone or carrier frequency is different from that produced by clock tone oscillator 12. Thus, both signals may be carried simultaneously on lead 20, and may be separated at the receiving points by conventional filters.

Typical of the data signals presented by modulator 42 to output lead 44 are those shown in the lower portion of FIG. 2. These represent signals corresponding in position to the timing signals on the upper line and are shown here as pulses 51, 52, 53, 54, 55, and 56. It will be noted that in each instance, the beginning of the data signal from the modulator is coincident with the beginning of the respective synchronous pulse from the clock. The minimum length of these data pulses is the same as the length of the respective clock pulses. This minimum signal is transmitted when the particular transmitting station input is zero voltage. Thus, as shown, pulses 51, 53 and 56 represent zero inputs. When there is an input the pulses will be longer, such as shown in signals 52, 54 and 55. It is the difference between the minimum signal length and the length of the signal actually being transmitted that represents the input function voltages to be transmitted from the transmitter.

Details of signal length are best shown in the illustration of FIG. 3. There two sequential pulses 60 and 62, representing a zero signal transmission, are shown, each 100 milliseconds in width. The maximum width they could be if they were transmitting a signal is shown by the dotted configuration 63, and is 600 milliseconds. Thus, a width of 100 milliseconds represents zero input, and 600 milliseconds represents the maximum input. If the maximum input is, say, ten volts, and 600 milliseconds width represents the ten volts and 100 milliseconds zero volts, then, comparably, five volts would be represented by a width of 350 milliseconds.

Measurement of the incoming information pulse commences at the trailing edge of the clock pulse and so the minimum zero length pulse is eliminated. Accordingly, even though pulse 55, shown in FIG. 2, is of much greater length for the information being conveyed, because it is related to synchronizing clock pulse "1," correct information may nevertheless be conveyed over that pulse. Circuitry for production and reading of the pulses of the various lengths is described below in connection with FIGS. 7 and 8.

FIG. 4 shows the so-called "slave" transmitter circuit. This circuit operates in the same manner as the master transmitter circuit of FIG. 1 except that, in lieu of having a clock circuit providing the originating clock timing pulses, the timing circuit of FIG. 4 receives the pulses from the circuit of FIG. 1, that is, the pulses over lead 14 and lead 20, and utilizes those for timing the transmissions from the slave circuit.

The timing pulses are received in the circuit of FIG. 4 through interconnecting lead 20 which passes to clock tone receiver 70. Clock tone receiver 70 is adapted to receive and detect signals having the frequency produced by clock tone oscillator 12. It, therefore, produces an output on its output lead 72 which is a series of pulses of the type shown in the upper curve of FIG. 2. That is, it produces thirty-one short pulses at 800 millisecond intervals, such as the pulses 7 followed by one long pulse 4 used as a synchronizing pulse.

The clock pulses from the clock tone receiver 70 pass through lead 72 and then lead 74 to the thirty-two position counter 76. This counter is similar to counter 22 of FIG. 1 in that it is a series of cascaded flip-flops providing a counting system for actuating various gates within this particular transmitter. Counter 76 has a reset position to which it is set by the long zero pulse 4 by switch pulse integrator 77, connected to lead 72. The output of integrator 77 produces a reset pulse for counter 76 through the lead 78. Integrator 77 may be a conventional delay multibrator for example. This reset feature assures cyclic resynchronization of counter 76 and counter 22. Counter 76 is so constructed that it may only advance from position 32 to position 1 by signal through line 78. Comparably, to the extent that there are other transmitters located throughout the circuit, these, too, will be cyclically resynchronized. Thus, it will be possible to have the various inputs at the various transmitters synchronized to send impulses at the proper moment throughout the circuit. For example, inputs "1" through "5" might be located at the master transmitter "6" through "10," at the first slave transmitter; and "10" through "31," at another slave transmiter.

In this respect it should be noted that the present telemetry system of my invention is not limited to thirty-one inputs for each transmission or channel tone. Each such carrier tone can accommodate a full set of sub channels. The limitation is dictated by the number of functions and the band width of the transmission link.

The output of counter 76 passes through lead 80 to the various input gates 82, 83 and 84, designated as gates "11," "12" and "N." These can be any gates desired as long as they do not duplicate gates of the same count number at other transmitters transmitting on the same tone carrier. Gates 82, 83 and 84 receive inputs "11,"

"12" and "N" on leads 86, 87 and 88, respectively. The remainder of the circuit of FIG. 4 operates in the same manner as the remainder of the circuit of FIG. 1. That is, there is a modulator 90 receiving timing pulses on lead 91 and input on lead 92 in a manner similar to modulator 42 with its leads 43 and 40. There is an output tone oscillator 95 which passes its output through lead 96 to tone gate 97. Tone gate 97 also receives the output of modulator 90 on lead 98 and pulses the carrier from oscillator 95 in accordance with the pulses received from modulator 90. The output of tone gate 97 then passes through lead 99 to the transmission line 20. The output frequency of oscillator 95 may be the same as that of oscillator 48, provided there are no more than a total of thirty-one inputs assigned to the master and slave transmitters together. If the total exceeds thirty-one, then oscillator 95 will have a different frequency.

There may be receivers in the circuit at as many locations as are desired. These receivers may be adapted to receive the transmissions from all or any selected group of inputs. One such receiver is shown in block-out lines in FIG. 5. In the upper portion of this figure, there is a timing circuit for receiving synchronizing pulses operating in a manner substantially identical to the timing circuit of FIG. 4. There is a clock tone receiver 110 receiving the modulated clock tone pulses through lead 20 and passing them through lead 112 to the thirty-two position counter 114 and the synchronizing pulse integrator 116. The output of integrator 116 passes through lead 117 to reset counter 114 for synchronization with the counter of the master transmitter. This occurs in the same manner as the resetting of counter 76. It should be noted that the master clock 5 and, counter 22, OR gate 8, tone gate 10, and clock tone oscillator 12, in box 15, are not necessarily located in a transmitting unit. They may just as well be located at one of the receiving units or elsewhere at an independent location on the circuit. The important thing is simply that there be only one such unit and that all of the transmitters and receivers within the circuit be timed to be operated by that clock unit.

Located below the timing circuit in FIG. 5 is a receiver unit adapted to receive those transmission desired at the particular location. The receiver here shown is adapted to receive the transmissions on only one tone channel. To the extent that other tone channels are used in the system, duplicate receivers will be necessary for such channels.

The input to the receiver of FIG. 5 from transmission line 20 is received in tone receiver 130 which is adapted to pass only those signals on the one particular tone channel desired. Receiver 130 receives those signals and detects them to produce pulses having a length proportional to the information being transmitted and of the nature shown on the bottom line of FIG. 2. These then pass through lead 131 to demodulator 132, the circuit of which is shown in FIG. 8. Demodulator 132 converts the pulses into voltages of magnitudes related to their lengths so that, in effect, it reproduces the inputs to the transmitters, that is, the inputs shown in FIG. 1 on leads 30, 31 and 32 and the inputs shown in FIG. 4 on leads 86, 87 and 88.

The signal from demodulator 132 passes through lead 135 to gates 137, 138 and 139, identified in FIG. 5 as gates "1," "2" and "N" respectively. The count numbers of these gates correspond to the count numbers of the input gates for the transmitted information which it is desired to receive at the particular receiving unit for a given tone channel.

Counter 114 has ten output leads represented by line 144, comparable to the outputs on lead 24 of counter 22 and lead 80 of counter 76. This output passes through lead 148 to other receivers at this receiving station adapted to receive data on other tone channels.

Gates 137, 138 and 139 are opened in the proper sequence as determined by the output of counter 114 and, when open, pass the signal from demodulator 132 to their respective storage units 152, 154 and 156 which are in turn connected to indicators 158, 160 and 162, respectively, through leads 153, 155 and 157, respectively.

Each storage unit receives its signal for its particular count number once every cycle of the counter and holds that signal until the next cycle. The signal being held is displayed on the respective indicator 158, 160 or 162, which may be a meter or other display means. Thus, even though information is not being transmitted for each station continuously, there is a continuous reading always available for observation. The reading on the indicator will change once each scanning or counting cycle if the input for the particular transmitter station has changed in the interval. In the preferred design the scanning cycle will be 800 milliseconds times thirty-two, or about 25.6 seconds.

Alternatively, the output from storage units 152, 154 and 156, and their counterparts for other channels or for other receiving stations, may be used to actuate automatic traffic control mechanisms or computers, either alternatively to, or in addition to, the read-out on the indicators 158, 160 and 162. This would be done with output leads connected to the storage units, such as lead or output circuit 163 from storage unit 152 to a computer or a traffic control device 164, and output circuit 168 from storage unit 156 to controller 169.

I turn now to the specific circuits used to provide the operation of the system. The clock and counter units are not described since they are standard circuitry, nor are the various gates, except in broad outline.

The various input gates on the transmitting units all utilize the same general circuitry. So, for purposes of illustration, FIG. 6 is shown as using input 30 and gate 33 of FIG. 1.

Input 30 passes to the base of transistor 180 which is wired in an emitter-follower configuration, the emitter of which leads through resistor 181 to a negative power source. Resistor 181 is a variably tapped resistor providing an output on lead 183. Transistors 180 and 182 together form a high impedance circuit. Zener diode 185 is connected between a source of positive potential in series with a resistance 186 and leads to the emitter of transistor 180. The junction of diode 185 and resistor 186 is connected to the base of transistor 182. The collector of transistor 182 is connected to a source of positive potential, and the emitter of transistor 182 is connected to the collector of transistor 180.

The variable contact 183 and resistor 182 of the emitter-follower configuration provides for 100% calibration of the input on line 30 so that it may be adjusted to the right order of magnitude for transmission purposes.

The output on 183 is fed into the base of transistor 190 which is cascaded with transistor 192 for further impedance adjustment. Across the base of transistor 192 and the emitter of transistor 190 is zener diode 194. Also connected to the base of 192 is resistor 195 in series with a source of positive potential. The output from the emitter of transistor 190 passes through lead 196 to zener diode 197 and thence to the junction of series resistors 198 and 199 connected between positive potential and lead 196. Resistor 199 has a variable tap 200 and is across diode 197. The variable tap 200 allows for a zero point calibration. The adjustment of the zero calibration is such that the lower potential point of the input will be at the base line 57 of the information signal shown in FIG. 2. This output from tap 200 then passes through resistor 202 through lead 201 to blocking diode 203 and thence to output lead 40 and so to the modulator 42 of FIG. 1, described in detail in FIG. 7.

The gate shown in FIG. 6 has a typical NOR gate configuration. It has five input diodes 210, connected to the five leads on output 24 which are the proper ones to actuate the gate for the count number desired. The output from diodes 210 passes through lead 212 to the base of transistor 214. The collector of transistor 214 is connected through resistor 215 to a source of positive potential. The emitter is connected to a source of negative potential. The collector of transistor 214 is also connected through lead 216 to the cathode of diode 218 and thence to lead 201 leading to the anode of diode 203. Lead 216 also passes through resistor 220 to a negative source of potential.

When there is no positive voltage applied to any of the diodes 210 at the input to the NOR gate, the collector of transistor 214 will be at a positive potential sufficient to cause the blocking diode 218 to be cut off and to allow the voltage at the zero calibration potentiometer 200 to appear through the forward-conducting coupling diode 203 to the output 40. On the other hand, when counter 22 is at any position or count number other than the one associated with this particular NOR gate, the counter will put out a positive voltage to one or more of the input circuits to diodes 210 which will cause transistor 214 to be saturated and the voltage at the collector impressed on line 216 will drop to a negative level. This will cause the voltage at the cathode of blocking diode 218 to be negative and thus to clamp the output of the potentiometer 200 at a point below ground resulting in coupling diode 203 being blocked. Thus, it will be seen that the input 30, as calibrated through the high impedance network described, will pass through blocking diode 203 to output line 40 only when there is no positive input to the NOR gate. That is, there will be an output for only the particular 800 milliseconds of the total cycle represented by a selected single count.

The output signal on lead 40, when passed by the NOR gate passes to a modulator such as, in this instance, modulator 42. Such modulator is shown in circuit diagram in FIG. 7. The purpose of the modulator circuit of FIG. 7 is to receive the adjusted input voltage and to produce an output pulse having a length bearing a functional relationship, preferably linear, to the size of the input voltage. This is accomplished through the utilization of a flip-flop circuit 240 having the usual "A" and "B" positions, and having the pulse length based upon the time it remains in the "A" position. The flip-flop is normally in the "B" position, which would represent the base line potential 57 as shown in FIG. 2. When the flip-flop is in position "A," it represents the upper voltage level identified as 58 in the lower curve of FIG. 2. The input to the "A" position on flip-flop 240 is through lead 242; and the input to the "B" position, through lead 244. Incoming clock pulses on lead 43 pass through blocking diode 245 to lead 242 and set flip-flop 240 to condition "A."

These clock pulses also pass through diode 246 into a timing circuit. These positive pulses leaving diode 246 pass through resistor 248 into the base of transistor 250 which transistor has its collector connected to a source of positive potential through a resistor 251; and its emitter, to a source of negative potential. The clock pulses then cause transistor 250 to conduct.

Associated with transistor 250 is timing capacitor 256. One side of this capacitor leads to negative potential; the other passes through lead 257, diode 258 and resistance 259 to the collector of transistor 250. Lead 258 also passes through diode 262 which leads to the moving arm of a potentiometer 263, which resistance is between sources of positive and negative potential. Resistor 263 provides for adjustment for a zero calibration.

Lead 257 is also connected to potentiometer 272 and series resistance 270 to a source of positive potential. Zener diode 280 is connected between the junction of resistances 270 and 272 and resistance 271 leading to a source of negative voltage. Transistors 274, 276 and 278 are interconnected to show a very high impedance to capacitor 256 and a low impedance output. The base of transistor 278 connects with capacitor 256 at lead 257, and the emitter of transistor 274 is connected to the junction of diode 280 and resistance 271. Diode 280 maintains the charging voltage to potentiometer 272 at a level which is a constant value above that on capacitor 256, thus developing a charge on capacitor 256 which increases linearly with time.

The low impedance output from transistor 274, which is representative of the voltage on capacitor 256, passes through lead 282 to the base of transistor 284.

When a clock pulse appears on lead 43 and, as above described, causes transistor 250 to conduct this, in turn, discharges timing capacitor 256 to the potential level of the zero calibration resistor 263. At the end of the clock pulse, such as at trailing edge 3 of pulse 30, as shown in FIG. 2, capacitor 256 then begins charging at the set constant rate. Since the current through resistor 272 is constant and the voltage drop across zener diode 280 is constant, the voltage on the output side of zener diode 280 will represent the voltage on charging capacitor 256. This voltage, carried by lead 282, is impressed on the base of comparison transistor 284. Transistor 284 has its collector connected to a source of positive potential and its emitter, through resistor 286, to ground.

Associated with input 40 is input transistor 230, with the voltage on 40 being applied to the base of transistor 230. The emitter of transistor 230 is connected through resistor 286 to ground, and its collector is connected through resistor 288 to a source of positive potential. The base of transistor is also connected through zener diode 231 to ground in order to limit the magnitude of the input on lead 40. As can be seen, therefore, the initial conductance of transistor 230 will be determined by the size of the potential on lead 40.

As the charge on timing capacitor 256 increases, however, the voltage drop across resistor 286 remains constant until the voltage on line 282 rises above that on line 40. Transistor 284 will then conduct, raising the voltage at the emitter of transistor 230. This results in transistor 230 ceasing to conduct, causing the collector voltage to rise. Connected to the collector of transistor 230 is output lead 290, passing through zener diode 291 to a Schmitt trigger generally depicted at 293. The output of the Schmitt trigger circuit is lead 244 leading into the "B" on the flip-flop 240. The rapidly rising voltage on lead 290 serves to trigger Schmitt trigger 293 and so set the flip-flop 240 to position "B." This accordingly provides the end of the output pulse for the information coding on lead 44.

Thus, it can be seen that a square wave output from flip-flop 240 is produced, the length of which varies in accordance with the potential of the input on lead 40. The greater the potential the longer the duration of the "on" period of the square wave, and, conversely, the lower the potential, the shorter will be the output "on" period. The result will be an envelope comparable to that shown in the lower line of FIG. 2; and a series of square waves having a length that varies from the minimum that is one hundred milliseconds to a maximum of 600 milliseconds depending upon the strength of the input voltage has been produced. It can also be seen that the input voltage used to regulate the length of each of these square waves in sequence will depend upon which input gate is open at the time; this, of course, is regulated by the particular counter associated with the circuits in question.

Output wave on lead 44 will pass to tone gate 46 for modulation of the tone oscillation from oscillator 48, as previously described, and thence through lead 50 to the common line 20 connecting all transmitters and receivers in the telemetry system.

The various transmitted signals representing the potential on the input from each transmitting station and transmitted by the series of pulses of varying lengths will be received by each receiver in the system adapted for receipt of signals on the particular channel in question. Each will have a counter and gate adapted to receive the signal for that particular count representing the transmitting station in question. There is one tone receiver for the clock tone and one counter for all channels to be received at the receiver location. In addition for each channel to be received there is a tone receiver 110 tuned to the particular channel. The receiver separates the tone pulses of one channel from the other channels and produces pulses which correspond in length to the tone information received. These pulses are fed into a demodulator. There is one demodulator for each tone channel in use, such as the demodulator shown in a circuit in FIG. 8.

The demodulator of FIG. 8 works in a manner similar to the modulator. A clock pulse is received from the clock tone receiver through lead 113 and goes to the base of transistor 310. The output of the collector of transistor 310 passes through blocking diode 312, resistor 313, and lead 314 to one side of timing capacitor 316, the other side of which is grounded. The collector of transistor 310 is connected to a source of positive potential through lead 318 and also, after passing through diode 312 and resistor 313, is led through diode 320 to the moving arm of a zero calibrating potentiometer 322.

Timing capacitor 316 is charged through variable resistor 330, diode 332, resistor 334, lead 335 and resistor 336, all in series leading to a source of positive potential. The charging rate here is maintained constant by use of zener diode 346 which leads back to the anode of diode 332. Transistors 340, 342, and 344 are so connected as to show a very high impedance to capacitor 316 and a low impedance output. Zener diode 346 maintains the charging voltage to potentiometer 330 at a level which is a constant value above that on capacitor 316, thus developing a charge on capacitor 316 which increases linearly with time in a manner comparable to the same circuit. The low impedance output from transistor 344, which is representative of the voltage on capacitor 316, leads to the various output gates through lead 135. Shown, for example in FIG. 8, are output gates 137, 138 and 139.

The input on lead 131 from the tone receiver 130 is impressed on the base of transistor 350, and the output thereof on the collector of that transistor is applied to a base of transistor 352. The emitter of the latter transistor is connected to lead 335 and so charges the timing capacitor 316. The emitter of transistor 352 leads to ground.

In operation then the demodulator receives a clock pulse through lead 113. This makes transistor 310 conduct and so discharges capacitor 316 to the potential level set by the zero calibration resistor 322. When the clock pulse ends, transistor 310 becomes non-conducting, and capacitor 316 is charged through the positive potential it passes through resistor 336, lead 335, resistor 334, lead or dial 332, and calibrating resistor 330. Charging will continue as long as transistor 352 is non-conducting. When this latter transistor is conducting, it will short lead 335 to ground and therefore cause charging rate of the capacitor to cease. The conduction of transistor 352 is determined by the input from the tone receiver on lead 131. As long as the pulse on 131 continues, transistor 350 will be conducting and transistor 352 will be non-conducting. When the pulse ceases, these conditions will be reversed. Thus, it can be seen that the length of time of charge of the capacitor 316 is determined by the length of the input pulse on lead 131, that is the length of the information signal, such as signal 52, for example, shown in the bottom curve of FIG. 2. It follows then that the charge on capacitor 316 will be greater for longer signals. It also can be seen that capacitor 316 does not begin to charge until the end of the timing pulse. Thus, it is that length of pulse exceeding the length of the clock pulse that determines the resulting charge on capacitor 316. This is in accordance with the desired design criteria as set forth in the discussion of FIG. 3. It will also be seen that the length of the pulse used for synchronization, that is the 900 millisecond pulse 4, shown in the top curve of FIG. 2, will not affect the accuracy of the reading on the output of transmitting station 1, since the output is determined only after the cessation of pulse 4.

FIG. 9 shows the gating arrangement, storage unit, and indicators for showing the input for each transmitting station. This storage unit and gate receives its input on lead 135, which is the output from the demodulator of FIG. 8, that is, demodulator 132 in FIG. 5.

NOR gate 137 receives its respective five timing leads 146 from counter 144 coded for the particular transmitting station to be received. The gate 137 also has, as an additional input, lead 134 from tone receiver 130. This latter prevents the gate from opening at any time during the actual transmission of a data pulse. Each of these input leads 146 and 134 to gate 137 passes through one of the usual type of gating diodes 360. The output of gate 137 passes into the base of transistor 362, the emitter of which leads to the source of negative potential and the collector of which passes through resistor 364 to a source of positive potential. The collector of transistor 362 is also connected to output lead 366.

If there are inputs on any of the leads 134 or 146 to NOR gate 137 there will be a positive voltage on the base of transistor 362, making the transistor conducting and accordingly providing a negative voltage on output lead 366. If there are no input voltages to the NOR gate, the transistor ceases to be conducting, and a positive voltage is presented on lead 366. Lead 366 is connected through diode 368 to the base of transistor 370. Likewise, the input lead 135, above described, from modulator 132, is connected through resistor 372 also to the base of transistor 370. If the potential on lead 366 is negative, diode 368 will be conducting and the input to the base of transistor 370 will be below ground. Conversely, if the lead on 366 is positive, it will block diode 368 and the input on lead 135 will then pass to the base of transistor 370. Thus, the input on lead 135 actuates transistor 370 only when the NOR gate 137 is open, that is, only for the timing period representing that particular input.

Storage unit 152 is made up of a storage timing condenser 390 and associated circuitry. The emitter of transistor 370 passes through lead 392 to the anode of diode 394 and thence to one side of capacitor 390. Lead 392 also goes to the anodes of diode 396 and 398 and through lead 400 up to the cathode of diode 402. The anode of diode 402 is connected to capacitor 390. The other side of capacitor 390 leads to a source of negative potential. Resistor 414 connects the cathodes of diodes 398, 412, and 402 to ground.

Connected to lead 366 is the base of another transistor 410, the emitter of which connects to the anode of a diode 412.

Lead 395, having thereon the charge voltage of capacitor 390 is connected to the base of transistor 420 which is one of three transistors 430, 422 and 424 which are cascaded in an emitter-follower relationship, and have their output lead through a calibrating resistor 426 to meter 158. The opposite terminal of meter 158 is connected to the tap of a zero calibrating resistor 428.

In operation, during the period that the input on lead 135 is passing through transistor 370, that voltage, if greater than the then existing voltage on capacitor 390, will increase the charge on that capacitor through diode 394. If the voltage on capacitor 390 exceeds the emitter voltage of transistor 370, diodes 394, 396 and 398 will block and capacitor 390 will discharge through diode 402 and resistance 414 to ground. However, diodes 396 and 398 will act as a clamp to limit this discharge to the voltage at the emitter of transistor 370.

At other times, the base voltage of transistor 370 will be below ground, causing diodes 394, 396, and 398 to block. The voltage at the collector of transistor 410 will be highly positive, causing the blocking of diode 402. Capacitor 390 will therefore be isolated.

The charge on capacitor 390 is amplified through the emitter-follower amplifier 420, and 422 and 424 may then be read on meter 158. Alternatively, this output may be applied to actuate a traffic control unit 164.

It should be noted that while the system herein described has transmitters at locations other than receivers, there is nothing in this system that precludes a receiver for an information channel being located at the location of the transmitter of another such channel, or the use of an information channel for transmission of commands between any two or more points in the system.

While the input and output voltages herein described are illustrated as analog voltages, a step function could just as readily be used, the decoding of which could give information as to the discrete condition of some function, such as indication of the offset pattern, selected cycle, power outage, etc. A circuit for transmitting discrete voltages is shown in FIG. 10.

As shown in the circuit of FIG. 10, there is an input gate modulator, tone gate and tone oscillator leading through the output line to the common transmission line 20; these have been described above with reference to the other figures. For convenience, one of the inputs of FIG. 1 has been adopted as an example. Thus, there is input 32 leading through gate 35 to lead 40 which passes to modulator 42 and then through lead 44 through tone gate 46. Tone gate 46 combines the output of tone oscillator 48, received through lead 49, and provides the pulse output modulated by the oscillation through lead 50 to common transmission line 20.

Input lead 32 comes from a three-relay input source adapted to receive and discriminate between discrete input voltages such as 0 volts, 4 volts, 6 volts, and 8 volts. The circuit includes a voltage divider made of series resistors 440, 442 and 444 leading between a positive voltage input 446 and ground. There are provided three relays 450, 452, and 454, leading to the anodes of blocking diodes 451, 453, and 455, respectively, and thence to a common line 456 which passes through resistor 458 to ground. Lead 456 is also connected to input lead 32. Each of relays 450, 452, and 454 is normally open and has its contact arm passing between the respective series resistors 440, 442, and 444 and to the respective diodes 451, 453, and 455 to lead 456. The voltage divider circuit of resistors 440, 442, and 444 will then provide an output voltage on input lead 32 having a magnitude which is dependent upon which of the three relays have been actuated. The highest output voltage will result from relay 450 being closed; the next, from relay 452; and the next, from relay 454. A zero output voltage will occur when all relays are open.

The inputs to the relay coils 450, 452, and 454 represent particular external circuit configurations. They can, for example, be energization of lines coming from a traffic signal or a control circuit, indicating the position or offset of the signal. They are identified as "A," "B" and "C" inputs respectively. Thus, if one of the relays is actuated, a discrete analog voltage will be transmitted through the varying pulse length transmission method described above. It will represent the particular control line which has been actuated. The fourth position signal for a zero output voltage will indicate that none of the three control lines actuating the three relays has been energized.

As can be seen, the circuit of FIG. 10 represents but one transmission of the thirty-one possible transmissions on each tone channel used in the system of my invention. The output signal, a pulse of a length corresponding to the particular relay that has been energized, passes in the same manner as with the other signals in the system through common transmission line 20 to a receiving unit. Here, by way of example, is shown the receiver of FIG. 5, utilizing the input of gate "N" 139. The signal passes from common transmission line 20 through tone receiver 130 and lead 131 to demodulator 132. Demodulator 132 is actuated ... of demodulator ... time pulses on lead 113. The output ing to the pulse length voltage on lead 135 corresponding through gate 139 to storage unit ed. This voltage passes poses of this illustration, and so to output elected for the purposes.

Output control line 168 leads through a voltage dividing network made up of resistors 466, 468, and 470 in series to ground. Each of these resistors is tapped at points 467, 469, and 471 and lead respectively to inputs of Schmitt triggers 472, 474, and 478. The taps in this voltage dividing network and in the voltage divider of the input should preferably correspond to produce similar circuit operation in the output. The outputs of these trigger circuits are applied to the respective bases of transistors 473, 475, and 479. The emitters of each of these transistors is grounded. The collectors of the transistors lead, respectively, to relay coils 482, 484, and 486; and the other terminal of each of these coils is connected to a source of positive potential.

The relay coils each actuate normally down relay arms 483, 485, and 487, respectively. Relay arm 483 connects to the zero output in the down position, and to the "A" output when up. The down position of relay arm 485 connects to arm 483; and the up position, to the "B" output. The down position of relay arm 487 connects to relay arm 485; and the up position, to output "C." The input of arm 487 is a source of potential.

In operation a signal is transmitted through line 20 having a pulse length corresponding to the relay of the input circuit actuated. The pulse will be longest for relay 450, next longest for 452, next for 454, and shortest if all three relays 450, 452, and 454 are open. The pulse will be demodulated, as above, and so the control lead 168 from storage unit 156 will store discrete output voltages of magnitude related to the magnitude on input 32. If the stored voltage is low, it will only be sufficient to actuate Schmitt trigger 472 and so relay coil 482; a higher voltage will actuate Schmitt trigger 474 and relay coil 484; and an even higher voltage will actuate Schmitt trigger 478 and operate relay coil 486. If there is no input voltage, arms 483, 485, and 487 will be down and the output will be on the zero circuit. If there is a small input voltage only arm 483 will be actuated, signalling an "A" output. A greater input voltage will actuate both arms 483 and 485; this will signal a "B" output since the input to arm 483 will have been disconnected, and arm 485 will be up. With the highest voltage input arm 487 will be connected to output "C," and the input to arm 485 will be disconnected. Thus, discrete signals may be transmitted by converting them to discrete voltages and then transmitting them as pulses through the circuit of my invention in the above manner. The transmitted pulses are then converted to analog voltages at the receiving end which in turn actuate desired relays, depending upon the strength of the analog voltage. Thus, outputs "A," "B," and "C" will be actuated in correspondence with their respective relays 450, 452, and 454 at the input section for the "A," "B," and "C" inputs. No relay actuation at the input and output occurs for the "O" position.

FIG. 11 shows a circuit for giving a warning or other indication in the event of the failure of one or more of the transmitting stations to transmit a data signal at the time in the transmission cycle allocated for that station. This circuit may also serve to check operation of the data tone receiver and data transmission link. This circuit includes an input from the clock tone receiver on lead 113 and an input from tone receiver 130 on lead 131. Shown adjacent these leads are examples of the type pulses that would be received. For instance, there would be a clock pulse 7 received on lead 113 and there would be a data pulse, such as pulse 56, received on lead 131. Lead 113 is here connected to a resistor 500 and then to the collector of transistor 502, the emitter of which is grounded. Lead 131 is connected to the base of transistor 502. The collector of transistor 502 is also connected through lead 504 to zener diode 506, and thence to a trigger circuit 508, such as a Schmitt trigger, and through resistor 510 to a source of negative potential. The output of the trigger circuit passes through lead 512 to an alarm or indicator unit 514.

When the transmission circuit is operating in a normal manner, there will be a data pulse such as 56 for each timing pulse 7. The data pulse will vary in length, but, as above described, will have a minimum width equal to the width of the timing pulse 7. Therefore, each time a data pulse occurs it will make transistor 502 conduct, and the clock pulse 7 will pass through lead 500 to ground. In the event a data pulse is not received synchronously with the clock pulse, transistor 502 will be non-conducting and the clock pulse 7 will pass through Zener diode 506 to actuate the trigger circuit 508. Trigger circuit 508 will then present an output signal on lead 512 to operate an alarm or other indicating mechanism 514. This will put the operator of the unit on notice that there is a failure in one of the transmission circuits.

As can be readily observed, the warning circuit of FIG. 11 may be placed at any point in the over-all system. It is only necessary to have a tone receiver at that point in the system adapted to receive the data tones corresponding to the channels being monitored for failure. If this is done at a receiving location, the data tone receiver at that location is also checked.

The foregoing description and the drawings are given to explain and illustrate my invention. It will be clear to those skilled in the art that modifications and variations of these can be made without departing from the scope of the invention.

I claim:

1. A telemetry system for reproducing at one or more receiving stations remote form at least two spaced transmitting stations all coupled by a single transmission channel, electrical signals of variable level representing data or control functions at the respective transmitting stations, said system including means for generating electrical signals of two distinct carrier frequencies for transmission over said channel, means for generating periodic timing pulses, means coupled to said pulse generator and to said carrier generator for employing the pulse output of said timing pulse generator to apply pulses of a first said carrier frequency to said transmission channel for transmission as timing pulse signals over said channel to all said stations, said timing pulse signals corresponding to each of said periodic timing pulses, a counter for each said transmitting station and coupled to said timing pulse generator to be controlled by said timing pulses to be advanced through a cycle of counting steps, means for coupling the counter associated with at least one of said transmitting stations to said transmission channel to be so advanced through its cycle in response to said timing pulse signals on said channel in synchronism with the counter or counters of the one or more other transmitting stations, means including at least one input gate at each transmitting station to receive said variable level signal as an input and convert it into a variable length pulse signal having time length variable substanially proportionately at least in part to the level of said input signal, said input gate being coupled to said counter to be controlled thereby at a particular step in said cycle, means at each such transmitting station for coupling said signal converting means to be controlled by said input gate and by said timing pulses for operating the associated signal converting means for modulating a second of said carrier frequencies at said particular step in said cycle in association with the timing pulses to provide variable length signal pulses of said second frequency for transmission on said channel, said particular step for one said input gate differing from that for any other said input gate, said last named coupling means at certain of said transmitting stations coupling said converting means to said transmission channel to be controlled by timing pulses derived from and corresponding to said timing pulse signals on said channel, and means including a counter at said receiving station coupled to said transmission channel to receive said timing pulse signals to be controlled thereby to be advanced through a corresponding cycle of counting steps in synchronism with the first said counter, and means coupled to said transmission channel at said receiving station to receive said variable length signal pulses to convert the same into electrical output signals of variable level, said level varying substantially proportionately at least in part to the time length of said variable length signal pulses, said last named converting means being coupled also to receive said timing pulse signals to be controlled thereby to provide said variable level output signals in response to said timing pulse signals, and means including at least two output gates and associated output circuits at said receiving station, said output gates being coupled to the counter at the associated receiving station to be controlled thereby to couple said last named converter means to said output circuits in sequence to pass the variable level output signal to said output circuits at respective particular steps in the counting cycle at the receiving station corresponding to the respective particular steps at the transmitting stations.

2. A telemetry system as in claim 1 and in which the converting means at each transmitting station includes a voltage level to pulse width modulator and the converting means at the receiving station includes a pulse width to voltage level demodulator.

3. A telemetry system as in claim 1 and in which said timing means includes a clock pulse generator for generating spaced timing pulses, and means coupled to one of the steps of one counter advanced by said spaced timing pulses to provide a distinctive timing pulse therefrom once per cycle, and means controlling the other said counters to advance the latter from a corresponding one step in response to said distinctive pulse for so synchronizing said counters.

4. A telemetry system as in claim 1 and including storage means individual to respective said output circuits at said receiving station to receive and store from one cycle to another the output signal of the converting means of said receiving station.

5. A telemetry system as in claim 1 and in which said input means at one transmitting station includes plural input circuits for receiving input signals from different sources of measurement or control data, means including gates for coupling said respective input circuits to said converting means to control the latter in different respective steps of the cycle of said counter whereby the data pulses from the respective sources are applied to the common transmission channel in sequence in said cycle, and in which the output means at said receiving station includes individual output circuits corresponding to the respective input circuits and means including gates for coupling the converting means of said receiving station to said respective output circuits in sequence in respective different steps of the cycle of the associated counter, in correspondence with the coupling of the input signals from the respective input circuits at the transmitting station.

6. A telemetry system as in claim 1 and in which said converting means at said transmitting stations includes means for providing as said variable length pulse signal a pulse having a first fixed part substantially coincident with the timing pulse and a second variable part of time length substantially proportional to said input signal level.

7. A telemetry system as in claim 6, and including discriminating means at said receiving station having one operating condition in response to the normal coincidence of the fixed part of said variable length pulse signal with the timing pulse and another operating condition in response to said timing pulse without said fixed part of said variable length signal; and indicator means for operating an indicator in response to said other operating condition of said discriminator means.

8. A telemetry system as in claim 1 and including plural input circuit means individually actuatable in response to individual input control thereof at one said transmitting station, means for providing different distinctive first and second level electrical signals to one of said input gates at said transmitting station in response respectively to a first of said plural circuit means and to a second of said plural circuit means being in actuated condition, plural output control circuits at said receiving station, and signal level responsive means at said receiving station for actuating first and second of said output control circuits selectively in response to first and second distinctive levels of the variable level output signal of the converter means at said receiving station.

9. A telemetry system as in claim 8 and including means for providing a distinctive third level electrical signal to one of said input gates in response to actuation of a third of said plural circuit means at said transmitting station, and means for actuating a third of said output control circuits at said receiving station in response to a third distinctive level of said variable level output signal thereat.

10. A telemetry system as in claim 8 and in which said last named plural input circuit means include traffic control circuits, and in which said last named plural output control circuits include traffic control circuits.

11. A telemetry system as in claim 1 and including a traffic control device coupled to said one of said output circuits to be controlled by said variable level signal.

12. A telemetry system as in claim 1 and including means for generating a third carrier frequency the frequency of which is distinct from said first and second frequencies, and in which said converting means at one of said transmitting stations modulates said third carrier frequency to provide the variable length signal pulses, and said receiving station includes further converter means and output gate means and coupling means coupling said further converter means to the counter and to the timing pulses and third carrier frequency pulses for converting the variable length pulse signals of said third carrier frequency into further electrical output signals of variable signal level.

References Cited by the Examiner

UNITED STATES PATENTS

| | | | |
|---|---|---|---|
| 2,531,153 | 10/1950 | Pennell | 178—69.5 |
| 2,554,886 | 5/1951 | Stedman | 178—69.5 |
| 2,797,403 | 6/1957 | Woodruff | 340—203 |
| 2,912,676 | 11/1959 | Canto et al. | 325—55 |
| 2,928,900 | 3/1960 | Pawley | 340—183 |
| 2,960,571 | 11/1960 | Malthaner | 325—41 |
| 3,031,603 | 4/1962 | Hills | 340—206 |
| 3,087,011 | 4/1963 | Boothroyd et al. | 178—5.2 |
| 3,129,385 | 4/1964 | Maestre | 325—38 |

DAVID G. REDINBAUGH, *Primary Examiner.*

B. V. SAFOUREK, *Assistant Examiner.*

UNITED STATES PATENT OFFICE
CERTIFICATE OF CORRECTION

Patent No. 3,268,814                  August 23, 1966

Charles L. Du Vivier

It is hereby certified that error appears in the above numbered patent requiring correction and that the said Letters Patent should read as corrected below.

Column 1, line 64, for "form" read -- from --; column 4, line 66, after "inputs" insert -- , but, as indicated above, is only illustrated as having thirty-one inputs --; column 5, line 42, for "transmission" read -- transmissions --; column 13, line 36, for "form" read -- from --; line 65, for "substanially" read -- substantially --.

Signed and sealed this 3rd day of December 1968.

(SEAL)
Attest:

Edward M. Fletcher, Jr.
Attesting Officer

EDWARD J. BRENNER
Commissioner of Patents